United States Patent [19]

Bowen

[11] 3,785,832

[45] Jan. 15, 1974

[54] DENTAL PRIMER VARNISH

[75] Inventor: Rafael L. Bowen, Gaithersburg, Md.

[73] Assignee: The United States of America as represented by the Secretary of Health, Education and Welfare, Washington, D.C.

[22] Filed: Oct. 13, 1971

[21] Appl. No.: 189,034

[52] U.S. Cl............................ 106/35, 32/13, 32/15, 260/DIG. 36
[51] Int. Cl............................................... C09k 3/00
[58] Field of Search................ 106/35; 260/DIG. 36, 260/309, 326.14, 326.3, 482, 486, 534; 32/13, 15; 264/16–20

[56] References Cited
UNITED STATES PATENTS

| | | | |
|---|---|---|---|
| 2,558,139 | 6/1941 | Knock et al. | 260/DIG. 36 |
| 3,200,142 | 8/1965 | Bowen | 260/486 X |
| 3,327,016 | 6/1967 | Lee | 106/35 X |
| 3,513,123 | 5/1970 | Saffir | 106/35 X |

Primary Examiner—Joseph L. Schofer
Assistant Examiner—J. B. Evans
Attorney—John S. Roberts, Jr. et al.

[57] ABSTRACT

A dental adhesive primer and varnish composition free of polymerizable monomers during storage and suitable specially for adhering dental direct filling resins and composite materials to human dentin and enamel consisting of the reaction product of N-phenyl glycine (NPG) type moiety and a glycidyl ether moiety containing at least one epoxy group such as p-chlorophenyl-2,3-epoxypropylether (CGE) or the reaction product of bisphenol A with epichlorohydrin (DGEBA) dissolved in the weight amount of about 5–15 percent in a suitable solvent, such as acetone, chloroform, and ether.

6 Claims, No Drawings

DENTAL PRIMER VARNISH

The present invention relates to coupling agents which may be applied as primers or varnishes to dental substrate surfaces and which mediate improved adhesive bonding to resin-containing materials, such as composite dental filling materials.

In general, a varnish in dental materials may be defined as cavity liner which contains a resinous film-forming agent dissolved in an appropriate volatile solvent (F. A. Peyton, *Restorative Dental Materials*, 3d edition, Mosby, 1968, page 447). An appropriate solvent that may be used to dissolve the resin or polymers includes chloroform, alcohol, acetone, benzene, toluene, ethyl acetate, and amyl acetate.

Another author, R. W. Phillips, *The Science of Dental Materials*, 6th edition, Saunders, 1968, pages 510–511, lists as appropriate organic solvents acetone, chloroform, and ether, and these latter are preferred in the practice of the present invention, with acetone as most preferred.

The use and benefit of varnishes are that they may be placed under a restoration or filling to protect the cut dentinal tubules from the ingredients of the filling material and to assist in prevention of leakage of oral fluids under the restoration. In this invention, the varnish improves adhesive bonding between the tooth surface and the restorative material and thus acts as a coupling agent. This invention specially contemplates the utilization of chelate-forming adducts (addition-reaction products) in which N-phenylglycine or derivatives thereof, are reacted with each glycidyl ether where the reaction sites are the N-H group of the amino acid and each reactive epoxy group. The reaction occurs normally with slight heating over a 2–3 hour period, and the adhesive product or coupling agent is then preferably dissolved to about 5–15 percent by weight in acetone and utilized as a primer varnish to improve adhesion between a resin or composite material and human dentin or enamel.

PRIOR ART

The patent prior art relative to this invention is believed to be as follows:

U.S. Pat. No. 3,200,142, Bowen. In this patent the coupling agent contained a chelate group similar to the present invention but also contained a polymerizable vinyl or methacrylate monomer group. However, the storage stability of solutions of the surface-active comonomer was lessened by virtue of the tendency of monomeric groups to polymerize during storage.

In the present invention it has been learned that there was sufficient dispersion-force interaction between the coupling agent and the overlying resin-containing dental material to produce significant adhesion even in the absence of copolymerizable groups. Thus, in the present invention, coupling agents containing in the same molecule an appropriate chelating group, together with a preferred aromatic moiety, have been found to give favorable adhesion. The compounds of the present invention have no monomer groups that can polymerize prematurely during storage as solutions and therefore convey greater storage stability capabilities adding to their present usefulness.

CHEMICAL VARIATION OF THE REACTANTS

With respect to the glycidyl ether-type compounds providing the epoxy groups, there may be utilized glycidyl ethers providing monoepoxy, diepoxy, or polyepoxy groups, and the ethers of the present invention may be described according to the following formula:

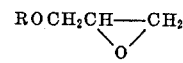

where R is a portion of the ether molecule more substantially described below. Where monoepoxies are utilized, a preferred ether is p-chlorophenyl glycidyl ether, and additional operable compounds include phenyl glycidyl ether and o-phenyl phenol glycidyl ether. Thus, in the formula above, for these compounds, respectively, R is p-chlorophenyl, phenyl and o-phenyl-phenyl.

Glycidyl ethers providing diepoxy groups may also be utilized in the present invention, and a preferred compound is the diglycidyl ether of bisphenol A, the diglycidyl ether of tetrachloro bisphenol A, and the glycerol diglycidyl ether (EPIOL G–100—Nippon), as well as the bisglycidyl ethers of chlorinated hydroquinone described in U.S. Pat. No. 2,682,547, Clemens et al. (Eastman) and the diglycidyl thio ethers of dithiols, U.S. Pat. No. 2,731,437, Bender (Carbide). Additionally, resorcinol diglycidyl ethers (ERE 1359—CIBA) may be utilized, as well as ethylene glycol diglycidyl ethers (EPIOL E–100—Nippon). Polyglycidyl reactants suitable for the present invention include tetraglycidoxytetraphenylethane (EPON 1031—Shell), as well as polyglycidyl ethers of novolac resins as exemplified under Union Carbide product ERR–0100 and the polyglycidyl ether of novolac polymers as exemplified by ECN 1325 and ECN 1299 CIBA.

Generally, the presence of a chloroaromatic, bromoaromatic, iodoaromatic, or polyaromatic group in the glycidyl ether moiety has been found to enhance the adhesive function of the final compound, whereas the presence of substantially aliphatic or fluorinated aliphatic moieties have the opposite effects.

As to the variation on the N-phenyl glycine reactant or fraction, the following have been found to be suitable variations of the basic N-phenyl glycine molecule as per the following formula:

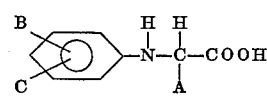

where A = H, $CH_3$
B = H, $CH_3$, $OCH_3$, p-Cl phenoxy
C = H, $CH_3$

For example, preferred ring substituted aromatic glycines are N-(p-methoxy phenyl) glycine, N-[p (p-chlorophenoxy) phenyl] glycine, and N-(3,5-dimethyl phenyl) glycine. Also operable are variations wherein the hydrogen on the α carbon of the glycine is replaced by methyl. It has been found further that substitution upward in the aliphatic series at α is deleterious due to steric hindrance.

The reaction products of the present invention may be compared favorably with natural materials such as copalite, a natural resin which has previously been used as a cavity varnish and is discussed in Peyton, ante, page 256, column 2.

EXAMPLE I

NPG–CGE

This coupling agent, NPG–CGE, is the addition reaction product of N-phenylglycine and p-chlorophenyl glycidyl ether (CPE). CPE (also called p-chlorophenyl-2,3-epoxypropyl ether, 0.527 mol, dissolved in 293 g methanol) was added dropwise to stirred aqueous N-phenylglycine (0.527 mol, brought to pH 7–9 with 0.527 mol of NaOH in 284 g $H_2O$) over a 2-hour period. The reaction was slightly exothermic. The temperature was 30° ± 5° C. the first hour and 50° ± 5° C. for 3 hours due to external heating. The reaction mixture was acidified to pH 3.8 with 0.527 mol HCl (concentrated aqueous solution), giving a crystalline precipitate (153.4 g net; 87 percent of theoretical yield; m.p. 93°–102° C. after recrystallization from methanol). The structural formula of NPG–CGE is:

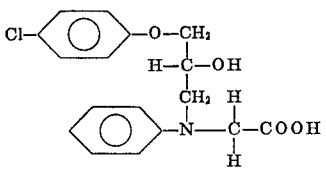

A 5 percent acetone solution was prepared and used to evaluate the capacity of this coupling agent, NPG–CGE, to improve adhesion between a resinous composite material and human dentin. An adhesion test was utilized which was previously reported in U.S. Pat. No. 3,200,142 at paragraphs 5 and 6. The results are shown in Table 1 below.

TABLE 1

[Adhesion between a composite restorative material and dentin as influenced by the application of a primer]

| | Days in water before testing | P.s.i.* | S.D.† | V.‡ |
|---|---|---|---|---|
| NPG–CGE primer | 1 | 280 | 26 | 9 |
| Acetone control | 1 | 30 | 27 | 90 |
| NPG–GMA primer | 1 | 320 | 94 | 29 |

*Pounds per square inch; average of 6 measurements.

† Standard deviation = $\sqrt{\frac{\Sigma(x-\bar{x})^2}{n-1}}$

‡ Coefficient of variation = $\frac{S.D.}{\bar{x}}$ (100%).

EXAMPLE II

Diglycidyl Ether of Bisphenol A/N-Phenyl Glycine

An adhesive varnish was synthesized by the dropwise addition of 0.5 mol of the diglycidyl ether of bisphenol A (dissolved in a mixture of 174 g methanol and 22 g acetone) over a 3-hour period to 1.0 mol of the sodium salt of N-phenyl glycine (dissolved in 506 g methanol and 150 g water) with stirring, and with an additional 4 hours at 70° C. The product was precipitated by the addition of 0.5 mol of calcium chloride (dissolved in 133 g water), filtered and dried. The apparent yield was quantitative. The liquifying temperature was 180°–200° C.

The calcium salt prepared above appeared to be insoluble in water, methanol, acetone or ether. It was slurried in 423 g acetone, and 1 mol of hydrochloric acid and 500 g water were added, resulting in two phases. The aqueous phase was discarded and 500 ml benzene was added. The solution was washed twice with 500 ml of water and subsequently was washed with 500 ml of cyclohexane, thinned with 290 g methanol and then washed twice with water, three times with boiling water, and finally with boiling cyclohexane, to remove contaminants. After drying overnight at 120° C. and 180 mm Hg, the product was a clear brown amorphous glass (220 g; 69 percent yield). Its structural formula is:

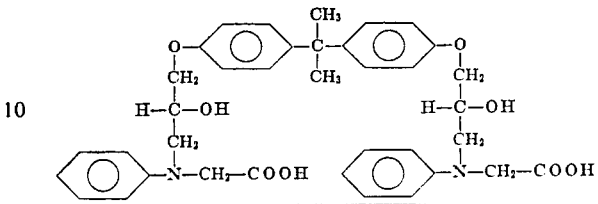

The varnish product was prepared by dissolving the product in acetone giving an 8.4 percent solution. The results as to adhesion to dentin are summarized in Table 2 below. Separate testing by independent operators verified the specific results given in the tables.

TABLE II

[Adhesion between a composite restorative material and dentin as influenced by the application of varnishes]

| | Days in water before testing | P.s.i.* | S.D.† | V.‡ |
|---|---|---|---|---|
| Acetone control | 1 | 20 | 20 | 95 |
| Adhesive varnish | 1 | 280 | 91 | 33 |
| Copalite ® varnish | 1 | 120 | 84 | 69 |
| Acetone control | 3 | 60 | 32 | 56 |
| Adhesive varnish | 3 | 200 | 104 | 52 |

*Pounds per square inch; average of 6 measurements.

† Standard deviation = $\sqrt{\frac{\Sigma(x-\bar{x})^2}{n-1}}$

‡ Coefficient of variation = $\frac{S.D.}{\bar{x}}$

Adhesion to human enamel is generally better than to human dentin; the results with dentin shown here are thus more critical.

The embodiments of this invention for which an exclusive property or privilege is claimed are defined as follows:

1. A dental primer varnish preparation suitable for adhering to a dental substrate consisting of the reaction product of an N-phenyl glycine (NPG) moiety selected from

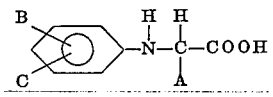

where A = H, $CH_3$
B = H, $CH_3$, $OCH_3$, p-Cl phenoxy
C = H, $CH_3$ and a glycidyl ether moiety selected from the group of p-chlorophenyl glycidyl ether, diglycidyl ether of bisphenol A, diglycidyl ether of tetrachloro bisphenol A, and tetraglycidoxytetraphenylethane, solubilized in a solvent selected from acetone, chloroform and ether at a strength of about 5–15 percent by weight wherein said reaction product is produced by reacting a molecule of the glycidyl ether with at least one molecule of the glycine to satisfy each glycidyl ether group present, said reaction being conducted at a temperature of about 30°–70°C for a period of 3–4 hours.

2. A varnish preparation according to claim 1 wherein the NPG moiety is N-phenyl glycine and the aromatic glycidyl ether moiety is p-chlorophenyl glycidyl ether in about 5–15 percent weight in acetone.

3. A varnish preparation according to claim 1 wherein the NPG reactant is N-phenyl glycine and the aromatic glycidyl ether moiety is the diglycidyl ether of bisphenol A dissolved in the amount of about 5–15 percent by weight in acetone.

4. The method of improving the adhesion of a resin filling material to human dentin and enamel which consists of interposing an adhesive primer varnish consisting of the reaction product of NPG moiety selected from

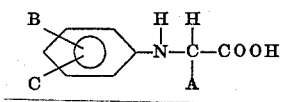

where A = H, CH$_3$
B = H, CH$_3$, OCH$_3$, p-Cl phenoxy
C = H, CH$_3$
and an aromatic moiety containing at least one glycidyl ether group said aromatic moiety containing no polymerizable vinyl or methacrylate group, solubilized in a solvent selected from acetone, chloroform and ether at a strength of about 5–15 percent by weight wherein said reaction product is produced by reacting a molecule of the glycidyl ether with at least one molecule of the glycine to satisfy each glycidyl ether group present, said reaction being conducted at a temperature of about 30°–70° C. for a period of 3–4 hours.

5. The method according to claim 4 wherein the NPG moiety is N-phenyl glycine and the aromatic glycidyl ether moiety is p-chlorophenyl glycidyl ether in about 5–15 percent by weight.

6. The method according to claim 4 wherein the NPG reactant is N-phenyl glycine and the aromatic glycidyl ether moiety is the diglycidyl ether of bisphenol A dissolved in the amount of about 5–15 percent by weight in acetone.

* * * * *